US012766680B2

(12) United States Patent
Hu

(10) Patent No.: US 12,766,680 B2
(45) Date of Patent: Oct. 20, 2026

(54) TORQUE ROD

(71) Applicant: Bobby Hu, Taichung City (TW)

(72) Inventor: Bobby Hu, Taichung City (TW)

( * ) Notice: Subject to any disclaimer, the term of this patent is extended or adjusted under 35 U.S.C. 154(b) by 216 days.

(21) Appl. No.: 18/938,322

(22) Filed: Nov. 6, 2024

(65) Prior Publication Data

US 2026/0070197 A1 Mar. 12, 2026

(30) Foreign Application Priority Data

Sep. 6, 2024 (TW) ................................ 113133821

(51) Int. Cl.
*B25B 23/14* (2006.01)
*B25B 23/00* (2006.01)
*B25B 23/12* (2006.01)

(52) U.S. Cl.
CPC ........ *B25B 23/141* (2013.01); *B25B 23/0035* (2013.01); *B25B 23/12* (2013.01)

(58) Field of Classification Search
CPC .... B25B 23/141; B25B 23/0035; B25B 23/12
USPC .......................... 81/9.4, 54, 177.8, 473, 489
See application file for complete search history.

(56) References Cited

U.S. PATENT DOCUMENTS 3,942,337 A * 3/1976 Leonard ................... F16D 7/08 464/36
4,413,937 A * 11/1983 Gutsche ................... B25F 3/00 408/239 R
4,630,512 A * 12/1986 Durr .................. B25B 23/0064 81/475
5,335,409 A * 8/1994 Elvebak ................. B25B 15/02 29/451
5,458,206 A * 10/1995 Bourner ............. B25B 23/1405 173/104
6,176,162 B1 * 1/2001 Ludwig ................ B25B 23/141 81/473
6,487,943 B1 * 12/2002 Jansson .................. B25B 15/02 81/475
9,555,526 B1 * 1/2017 Gauthier .............. B25B 23/141
10,751,862 B1 * 8/2020 Edmisten ............... B25B 23/16

(Continued)

FOREIGN PATENT DOCUMENTS

TW 201244887 A * 11/2012
TW I398327 B 6/2013

(Continued)

*Primary Examiner* — Robert F Long
(74) *Attorney, Agent, or Firm* — WPAT, PC

(57) ABSTRACT

A torque rod includes a main body; a transmission rod inserted to the main body and having a surrounding first groove exposed from the main body; an anti-release sleeve member mounted around the main body and having a second groove on an inner edge, with a setting space formed by the second groove and the first groove; a low-friction device in the setting space; a clutch device connected with the transmission rod and switchable between a transmission and a declutched statuses; a torque device providing a predetermined torque abutting against the clutch device, so the clutch device is in the transmission status, whereby the transmission rod transmits a torque through the clutch device to the main body. When the transmission rod bears a torque greater than the predetermined torque, the clutch device enters the declutched status, preventing the torque from being transmitted to the main body.

13 Claims, 8 Drawing Sheets

(56) References Cited

U.S. PATENT DOCUMENTS

| | | | | |
|---|---|---|---|---|
| 2007/0089535 | A1* | 4/2007 | Chen | B25B 23/141 73/862.22 |
| 2007/0289420 | A1* | 12/2007 | Gao | B25B 23/141 81/474 |
| 2008/0087515 | A1* | 4/2008 | Gao | B25B 23/1427 192/48.1 |
| 2009/0049961 | A1* | 2/2009 | Chen | B25B 23/14 81/429 |
| 2009/0255386 | A1* | 10/2009 | Liao | B25B 23/1427 81/124.5 |
| 2011/0036212 | A1* | 2/2011 | Santamarina | B25B 23/14 81/436 |
| 2014/0060270 | A1* | 3/2014 | Wu | B25B 23/141 81/474 |
| 2015/0151416 | A1* | 6/2015 | Chen | B25B 23/0035 81/180.1 |
| 2017/0128116 | A1* | 5/2017 | Hansell | B25B 23/1427 |
| 2018/0104801 | A1* | 4/2018 | Bakula | B25B 23/1427 |
| 2019/0344369 | A1* | 11/2019 | Lin | B23G 1/28 |
| 2020/0240397 | A1* | 7/2020 | Hsieh | B25B 13/06 |
| 2021/0268630 | A1* | 9/2021 | Hegarty | B25B 21/004 |
| 2021/0354271 | A1* | 11/2021 | Soucy | B25B 15/02 |
| 2023/0140601 | A1* | 5/2023 | Cottrell | B25B 23/141 81/475 |
| 2024/0261876 | A1* | 8/2024 | Dilling | B23B 49/005 |
| 2025/0100114 | A1* | 3/2025 | Lai | B25B 23/141 |
| 2025/0121481 | A1* | 4/2025 | Emmerich | B25F 5/001 |

FOREIGN PATENT DOCUMENTS

| | | | |
|---|---|---|---|
| TW | I606896 | B | 12/2017 |
| TW | M600678 | U | 9/2020 |
| TW | I729619 | B | 6/2021 |

* cited by examiner

TORQUE ROD

BACKGROUND OF THE INVENTION

1. Field of the Invention

The present application relates to torque rods, and more particularly, to a torque rod with low friction and structural simplicity.

2. Description of the Related Art

Referring to Taiwan patent M600678, a torque screwdriver is disclosed, comprising a main body, an outer casing, an upper torque member, and a lower torque member. It utilizes the upper embedded teeth of the upper torque member and the lower embedded teeth of the lower torque member as the components for connection (driving) and disconnection (idling). However, the outer casing simply covers the main body, without providing axial positional limitation, risking the detachment from the main body. Furthermore, the position limiting pin of the torque screwdriver is positioned between the pin hole of the main body and the position limiting groove of the transmission member, which requires additional corresponding holes during the manufacturing process, failing to meet an effective reduction of the manufacturing cost. Also, the contact area between the position limiting pin and the outer casing is relatively large, easily causing wearing and reducing the service life of the product.

Referring to Taiwan patent I729619, a bearing structure is disclosed, which is positioned at two ends of a surface anti-slip structure to achieve a friction reduction between components. However, the bearing structure requires low-friction components to be incorporated with surrounding elements, so as to form one bearing structure. Therefore, such patent is subject to complexity in overall structure and high manufacturing costs.

Referring to Taiwan patent I398327, a bearing structure disposed at both ends of a grip tube is disclosed, in which the bearing structure is installed in cooperation with steel balls and surrounding components, thus also resulting in a complex overall structure and high manufacturing costs.

Further referring to Taiwan patent I606896, a bearing installed at two ends of a rod body to reduce friction is disclosed. However, the edges of the components in contact with the bearings are all flat, resulting in a significant frictional wearing between the bearings and neighboring components. Furthermore, such patent is also subject to complexity in overall structure and high manufacturing costs.

SUMMARY OF THE INVENTION

The present application aims at resolving the issues of conventional torque rods having structural complexity and high manufacturing cost.

For achieving the aforementioned objectives, a torque rod in accordance with an embodiment of the present application is disclosed, comprising:

a main body having a first end and a second end arranged in opposite to each other along a central axis thereof;

a transmission rod having an insertion end and a first groove, the insertion end being inserted to the first end along the central axis, the first groove disposed around a periphery of the transmission rod and exposed from the first end;

an anti-release sleeve member having a connection part and a stop part that are connected, the connection part being mounted around the first end, so that the anti-release sleeve member is prevented from detaching from the main body along the central axis, the stop part having a second groove disposed on an inner edge thereof, with a setting space formed by the second groove and the first groove;

a low-friction device having a plurality of spherical contact members covered by the anti-release sleeve member and disposed in the setting space, each spherical contact member having a longitudinal axis arranged in parallel to the central axis and dividing the spherical contact member into a first half and a second half, the first half disposed in the first groove in an axial interference arrangement, the second half disposed in the second groove in an axial interference arrangement;

a clutch device disposed in the main body and connected with the insertion end, and switchable between a transmission status and a declutched status;

a torque device disposed in the main body along the central axis and providing a predetermined torque abutting against the clutch device, so that the clutch device is in the transmission status, whereby the transmission rod transmits a torque through the clutch device to the main body;

wherein when the transmission rod bears a torque which is greater than the predetermined torque, the clutch device is switched to the declutched status, whereby the transmission rod is unable to transmit the torque to the main body.

With the configuration, the present application simply utilizes a low-friction device to effectively lower the rotational friction between the transmission rod and the main body, thereby reducing the wearing and improving the service life.

Also, by the cooperation of the transmission rod and the anti-release sleeve member, the setting space for housing the low-friction device is formed, preventing the spherical contact members of the low-friction device and the transmission rod from detaching from the main body. Also, with the overall structural simplicity, the present application facilitates the quick assembly and lowers the overall manufacturing cost.

DETAILED DESCRIPTION OF THE INVENTION

Figure 1:
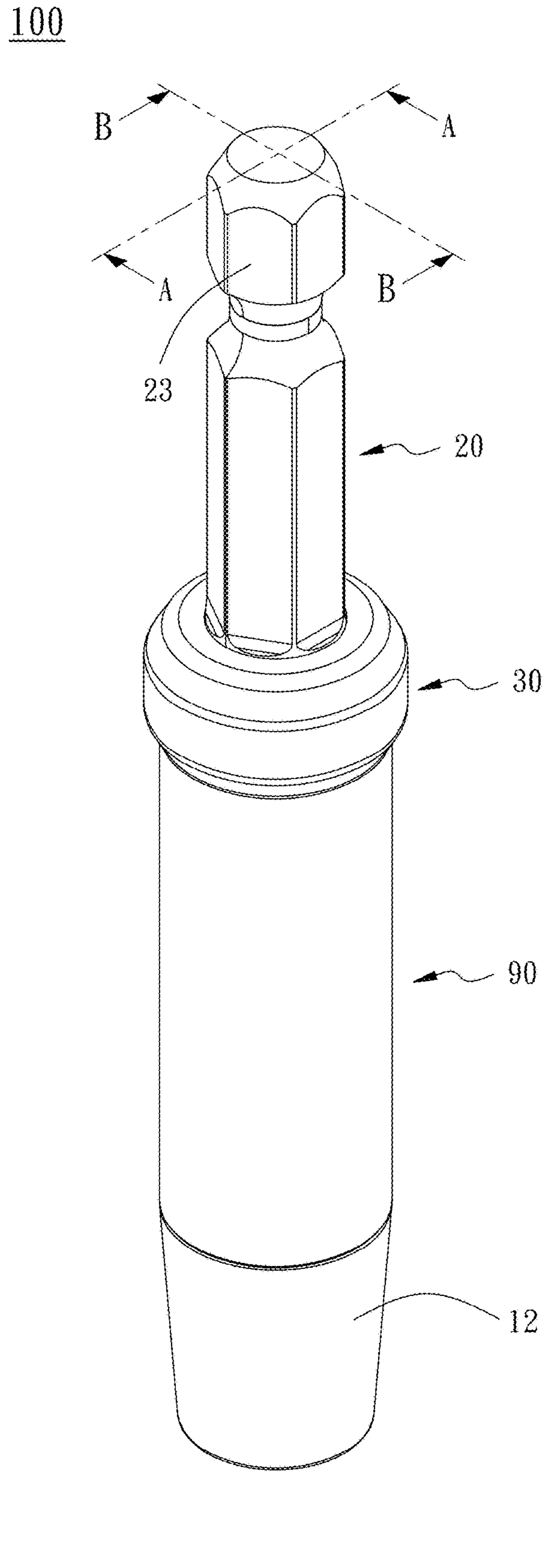
FIG. 1 is a perspective view of the torque rod in accordance with an embodiment of the present application.

The aforementioned and further advantages and features of the present application will be understood by reference to the description of the preferred embodiment in conjunction with the accompanying drawings where the components are illustrated based on a proportion for explanation but not subject to the actual component proportion.

Referring to FIG. 1 to FIG. 6, the present application discloses a torque rod 100 in accordance with an embodiment of the present application, comprising a main body 10, a transmission rod 20, an anti-release sleeve member 30, a low-friction device 40, a clutch device 50, and a torque device 60. Therein, the present application is used to be connected with a wrenching tool for driving a fastener, so as to prevent the fastener from being less-tightened or over-tightened. Therein, the wrenching tool is allowed to be a manual, electric, or pneumatic wrenching tool.

The main body 10 has a first end 11 and a second end 12 disposed in opposite to each other along a central axis L. Therein, the first end 11 is used to be connected with the transmission rod 20. The transmission rod 20 is used to be connected with the wrenching tool. The first end 11 has a first outer diameter R1. The second end 12 has a workpiece combination hole 121, which is formed in a polygonal shape to receive a tool head, and the tool head is combined with said fastener.

Figure 2:
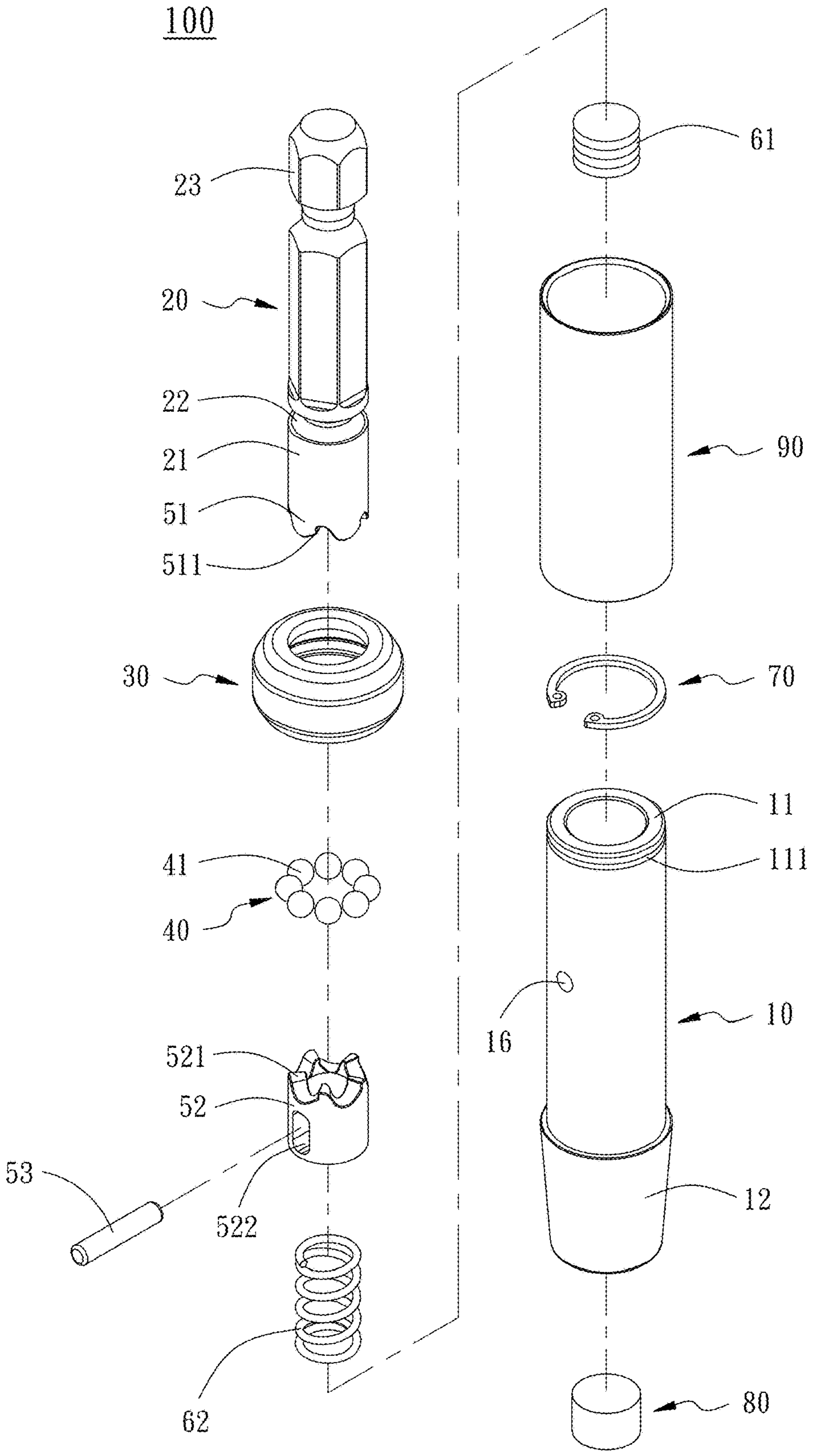
FIG. 2 is an exploded view of the torque rod in accordance with an embodiment of the present application.
Figure 3:
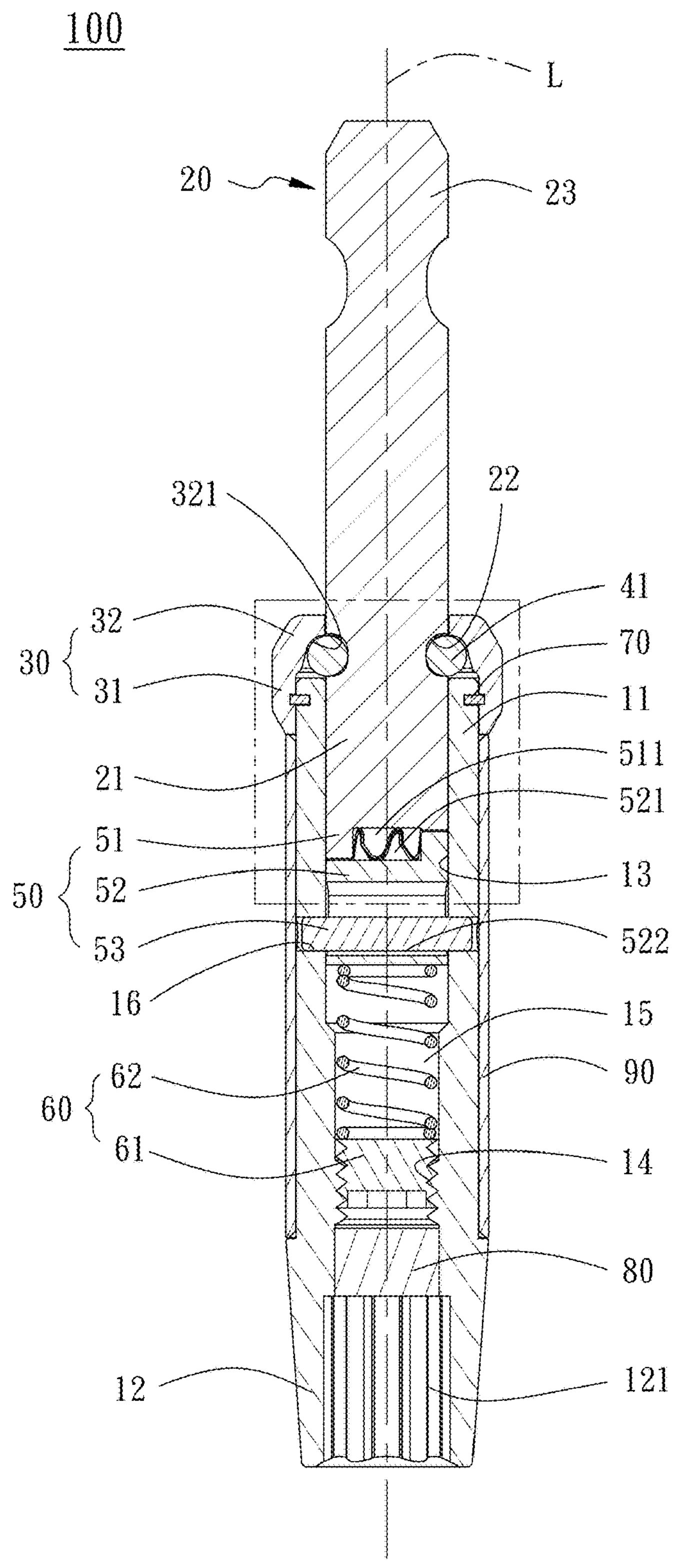
FIG. 3 is a cross-sectional view taken along line A-A in FIG. 1.

Referring to FIG. 2 and FIG. 3, in the first embodiment of the present application, the main body 10 comprises a chamber 13 therein.

The transmission rod 20 has an insertion end 21 and a first groove 22. The insertion end 21 is inserted to the first end 11 along the central axis L. In the first embodiment, the first groove 22 is disposed around the periphery of the transmission rod 20 and exposed from the first end 11. Therein, the first groove 22 is an arc-shape groove.

Referring to FIG. 1 and FIG. 3, in the first embodiment, the transmission rod 20 has a tool connection end 23 disposed away from the insertion end 21. The tool connection end 23 is used to be connected with the wrenching tool, so that the wrenching tool transmits the torque to the main body 10 through the tool connection end 23 and the insertion end 21, whereby the main body 10 drives the fastener by use of the tool head.

The anti-release sleeve member 30 has a connection part 31 and a stop part 32 that are connected. The connection part 31 is mounted around the first end 11, so that the anti-release sleeve member 30 is unable to be detached from the main body 10 along the central axis L. The stop part 32 has a second groove 321 disposed on the inner edge thereof. The second groove 321 and the first groove 22 form a setting space S for housing the low-friction device 40.

Figure 4:
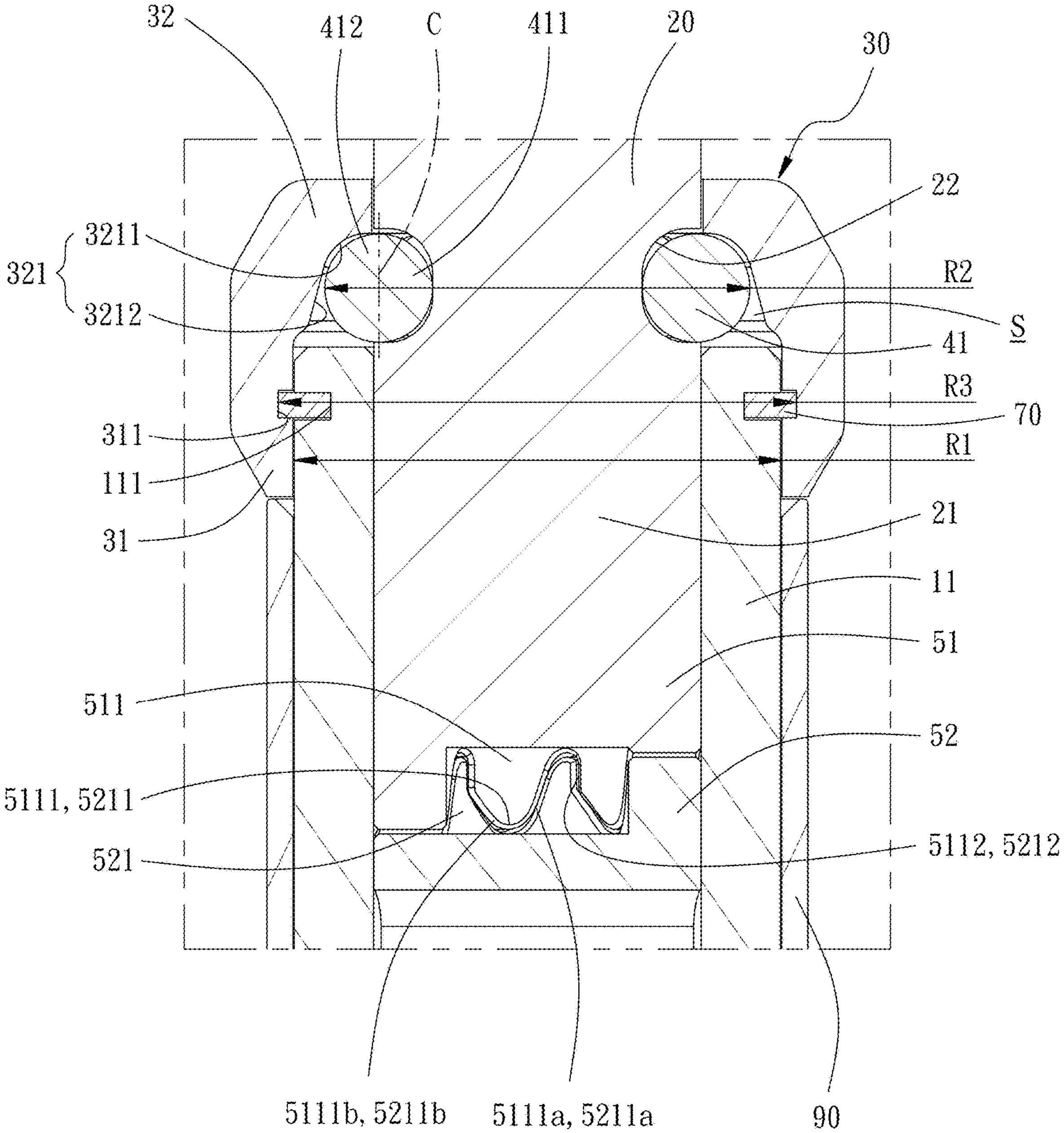
FIG. 4 is a partially enlarged view of FIG. 3.

Referring to FIG. 3 and FIG. 4, in the first embodiment, the second groove 321 comprises a stop segment 3211 and an inclined retreat segment 3212 that are connected. The stop segment 3211 and the low-friction device 40 generate a movement limitation which prevents the transmission rod 20 from detaching from the main body 10 along the central axis L, so as to limit the axial movement of the transmission rod 20, whereby the transmission rod 20 is only allowed to drive the main body 10 to move about the central axis L. Therein, the stop segment 3211 is formed in an arc shape.

The low-friction device 40 comprises a plurality of spherical contact members 41, which are covered by the anti-release sleeve member 30 in the setting space S, such that the anti-release sleeve member 30 prevents the spherical contact members 41 from detachment. Each spherical contact member 41 has a longitudinal axis C in parallel with the central axis L, and the longitudinal axis C divides the spherical contact members 41 into a first half 411 and a second half 412. The first half 411 is disposed in the first groove 22 in an axial interference arrangement, and the second half 412 is disposed in the second groove 321 in an axial interference arrangement. Accordingly, the axial interference relationships between each spherical contact member 41 with respect to the first groove 22 and the second groove 321 limit the axial movement of the transmission rod 20 and achieve the axial positional limitation function. Therein, in an embodiment, the volume of the first half 411 is equal to the volume of the second half 412, so that each spherical contact member 41 is stably balanced in the setting space S. In other embodiments, the volumes of the first half 411 and the second half 412 are allowed to be different.

Therein, the stop segment 3211 and the spherical contact members 41 achieve a positional stopping effect. The spherical contact members 41 are steel balls, and disposed in the setting space S in a ring shape arrangement, so that the transmission rod 20 and the low-friction device 40 are in a multi-point contact. Also, the anti-release sleeve member 30 and the low-friction device 40 are in a multi-point contact as well. Therefore, when the transmission rod 20 drives the main body 10, the spherical contact members 41 lower the friction and wearing between different components.

Also, the inclined retreat segment 3212 is inclined and retreated toward the direction away from the low-friction device 40 and does not contact the low-friction device 40, so as to further reduce the contact between the anti-release sleeve member 30 and the low-friction device 40, lowering the friction resistance.

Referring to FIG. 3 and FIG. 4, in the first embodiment, the low-friction device 40 has a second outer diameter R2 which is smaller than the first outer diameter R1. Also, the length of the stop segment 3211 is smaller than the diameter of each spherical contact member 41. Therein, the second outer diameter R2 is the outer diameter of the low-friction device 40 after being disposed in the setting space S.

Referring to FIG. 3 and FIG. 4, in the first embodiment, a clamp ring 70 is further included and disposed between the connection part 31 of the anti-release sleeve member 30 and the first end 11 of the main body 10. Therein, the connection part 31 comprises a peripherally formed first setting groove 311, and the first end 11 comprises a peripherally formed second setting groove 111. The clamp ring 70 is embedded between the first setting groove 311 and the second setting groove 111, so that the clamp ring 70 prevents the anti-release sleeve member 30 from detaching from the main body 10 along the central axis L. The clamp ring 70 has a third outer diameter R3. The second outer diameter R2 is smaller than the third outer diameter R3. The clamp ring 70 is a C-clamp.

The clutch device 50 is disposed in the chamber 13 of the main body 10 and connected with the insertion end 21. The clutch device 50 is switchable between a transmission status, and a declutched status. Therein, when the clutch device 50 is in the transmission status, the wrenching tool is able to transmit the torque through the transmission rod 20 and the clutch device 50 to the main body 10, whereby the main body 10 drives the fastener by use of the second end 12. When the clutch device 50 is in the declutched status, the clutch device 50 generates a slipping effect, so that the wrenching tool is unable to transmit the torque through the transmission rod 20 and the clutch device 50 to the main body 10, thereby preventing the fastener from being over-driven.

Referring to FIG. 3 to FIG. 6, in the first embodiment, the clutch device 50 has a first tooth member 51 and a second tooth member 52. The first tooth member 51 is integrally formed with the insertion end 21 of the transmission rod 20.

The first tooth member 51 has a plurality of first tooth parts 511 arranged away from the tool connection end 23. The second tooth member 52 is slidably disposed in the chamber 13 along the central axis L. The second tooth member 52 has a plurality of second tooth parts 521 optionally engaged with or disengaged from the first tooth parts 511.

Figure 5:
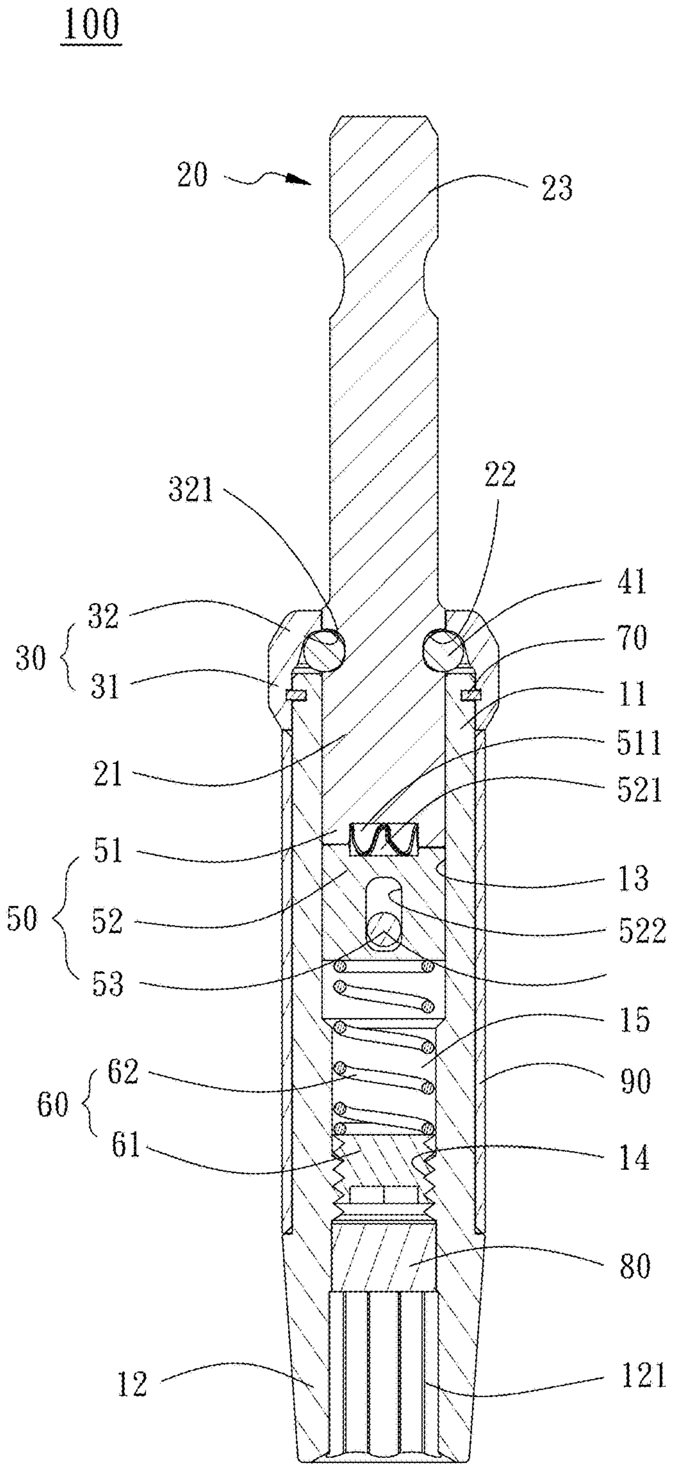
FIG. 5 is a cross-sectional view taken along line B-B in FIG. 1, illustrating the first tooth member and the second tooth member in the engagement position.

Therein, when the clutch device 50 is in the transmission status, the first tooth member 51 and the second tooth member 52 are stably positioned at the engagement position (as shown by FIG. 5), so that the torque of the wrenching tool is successfully transmitted to the main body 10. When the clutch device 50 is in the declutched status, the first tooth member 51 and the second tooth member 52 generate a slipping effect, so that the first tooth member 51 and the second tooth member 52 are repeatedly switched between the engagement position and the disengagement position (as shown by FIG. 6), so that the torque of the wrenching tool is unable to be transmitted to the main body 10.

Figure 6:
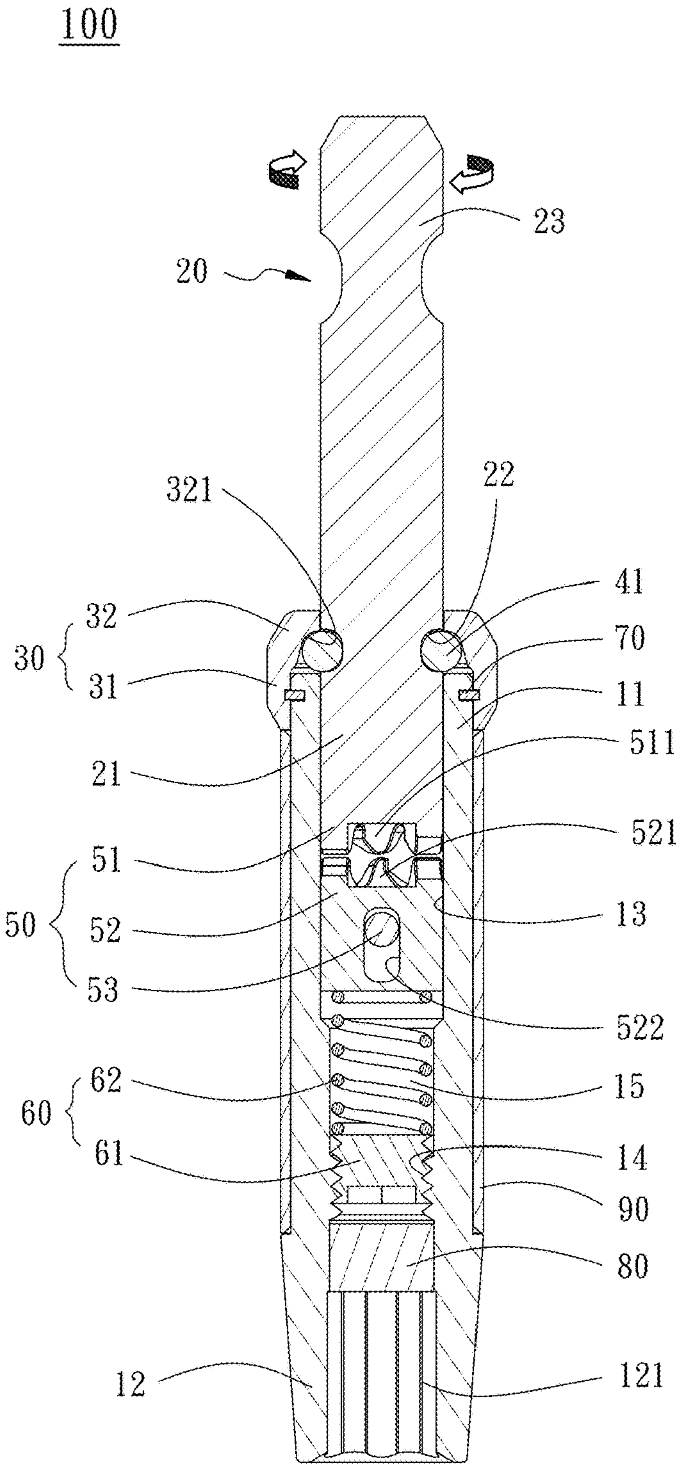
FIG. 6 is a cross-sectional view taken along line B-B in FIG. 1, illustrating the first tooth member and the second tooth member at the disengagement position.

Referring to FIG. 3, FIG. 5, and FIG. 6, in the first embodiment, the clutch device 50 further comprises a position limiting rod 53. A long groove 522 passes through the periphery of the second tooth member 52 and extends along the central axis L. The main body 10 comprises a transverse hole 16 disposed thereon along a direction in perpendicular to the central axis L. The position limiting rod 53 passes through the transverse hole 16 and the long groove 522, such that when the clutch device 50 is in the declutched status, the second tooth member 52 is only allowed to move along the central axis L and prevented from rotating.

Referring to FIG. 3 to FIG. 6, in the first embodiment, each first tooth part 511 has a first arc segment 5111 and a first vertical segment 5112; each second tooth part 521 has a second arc segment 5211 and a second vertical segment 5212. When the first tooth part 511 is engaged with the second tooth part 521, each first arc segment 5111 adheres to the corresponding second arc segment 5211, and each first vertical segment 5112 abuts against the corresponding second vertical segment 5212. With the abutting relationship between each first vertical segment 5112 and each second vertical segment 5212, the first tooth member 51 achieves an unidirectional rotation movement.

Therein, referring to FIG. 3 to FIG. 6, the first arc segment 5111 further comprises a first support segment **5111*a* and a first smooth segment 5111*b*; the second arc segment 5211 further comprises a second support segment 5211*a* and a second smooth segment 5211*b*. When the clutch device 50 is in the declutched status, the first support segment 5111*a* and the second support segment 5211*a* support each other, so that the first tooth member 51 moves from the engagement position to the disengagement position. Meanwhile, the first smooth segment 5111*b* and the second smooth segment 5211*b* allows the first tooth member 51 to smoothly move from the disengagement position to the engagement position, so as to reduce the impact force caused by positional difference and extends the service life of the clutch device 50**.

The torque device 60 is disposed in the main body 10 along the central axis L. The torque device 60 provides a predetermined torque abutting against the clutch device 50, so that the clutch device 50 is in the transmission status, such that the transmission rod 20 transmits the torque through the clutch device 50 to the main body 10, thereby driving the fastener to rotate, finishing the fastening operation of the fastener. During operation, when the transmission rod 20 bears a torque which is larger than the predetermined torque, the clutch device 50 is switched to the declutched status, so that the transmission rod 20 is unable to transmit the torque to the main body 10, thereby preventing the fastener to be over-tightened and damaged.

Referring to FIG. 3, in the first embodiment, the chamber 13 is in communication with a thread hole 14 and a spring hole 15 away from the first end 11. The clutch device 50 is housed in the chamber 13. The torque device 60 is housed in the thread hole 14 and the spring hole 15. Therein, the torque device 60 comprises a fix member 61 and an elastic member 62. The fix member 61 is screwed to the thread hole 14. The elastic member 62 is disposed in the spring hole 15. The elastic member 62 has one end thereof abutting against the clutch device 50 and another end abutting against the fix member 61, whereby the elastic member 62 provides the predetermined torque to the clutch device 50. Also, the torque device 60 has a magnetic member 80 arranged away from the first end 11. The magnetic member 80 is located at an inner end of the workpiece combination hole 121 to magnetically attract the fastener.

Referring to FIG. 2 and FIG. 3, in the first embodiment, a cover member 90 is further included. The cover member 90 is mounted around the main body 10, such that the position limiting rod 53 is unable to detach from the main body 10 along the direction in perpendicular to the central axis L, whereby the cover member 90 stably fixes the position of the position limiting rod 53.

Figure 7:
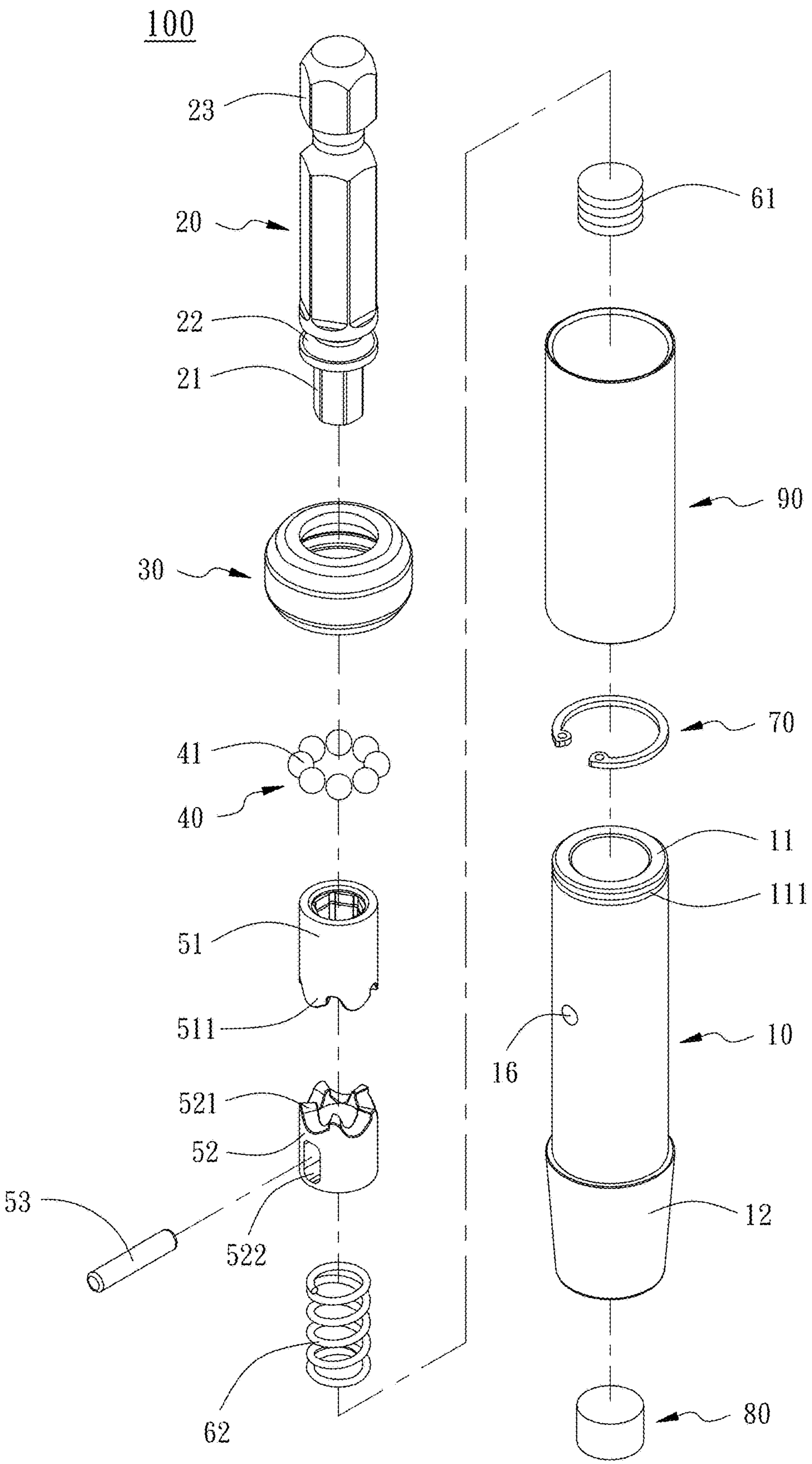
FIG. 7 is an exploded view of the torque rod in accordance with a second embodiment of the present application.
Figure 8:
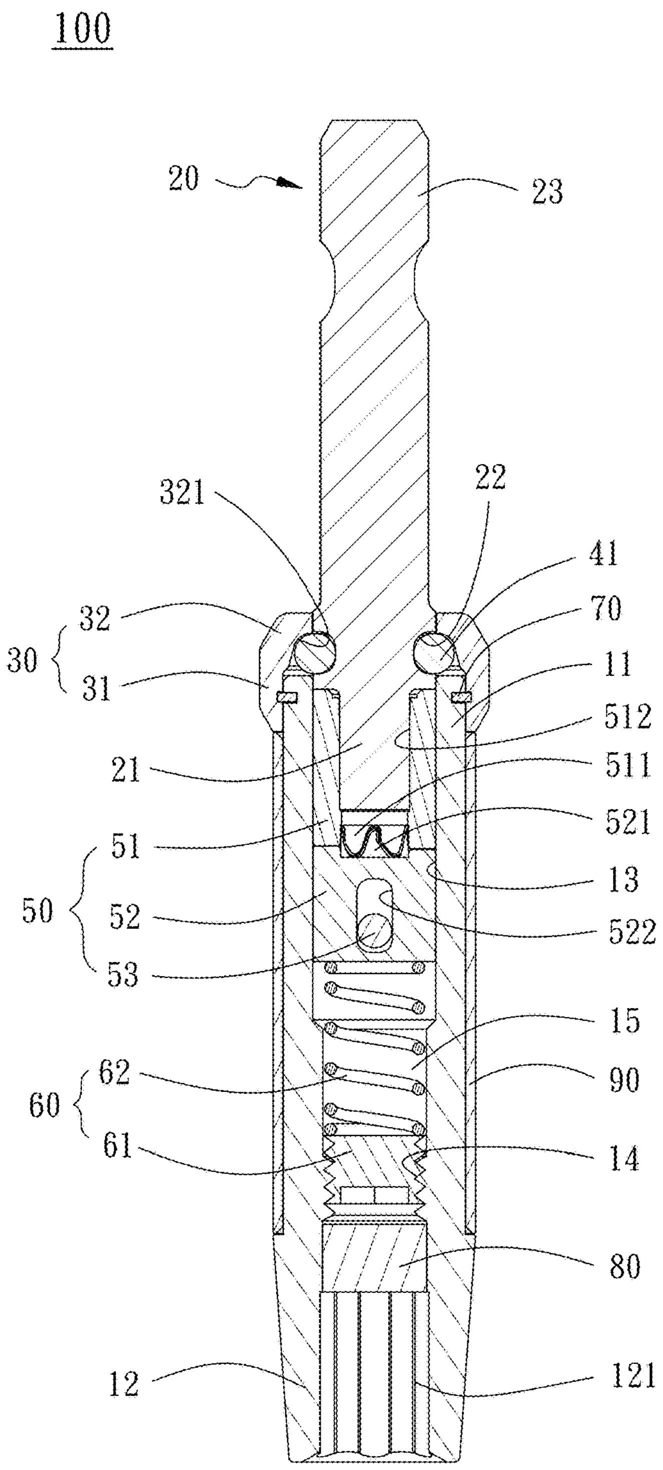
FIG. 8 is a sectional view of the torque rod in accordance with a second embodiment of the present application.

Referring to FIG. 7 and FIG. 8, a second embodiment of the present application is disclosed. The difference between the second embodiment and the first embodiment lies in that the first tooth member 51 comprises a plurality of first tooth parts 511 and a sleeve hole 512. The sleeve hole 512 is mounted around the insertion end 21 of the transmission rod 20, and the first tooth member 51 is separated from the transmission rod 20. Accordingly, the second embodiment of the present application achieves the same functions as the first embodiment.

With the foregoing configuration, the present application achieves following advantages.

By simply utilizing the cooperation of only one low-friction device 40, the first groove 22, and the second groove 321, the present application effectively lowers the rotational friction between the transmission rod 20 and the main body 10, so as to reduce the wearing and improve the service life, which possess non-obviousness.

Through the simple cooperation of the transmission rod 20 and the anti-release sleeve member 30, the setting space S for receiving the low-friction device 40 is formed, so as to lower the assembly difficulty and the overall manufacturing cost, which possess non-obviousness.

Through the positional stopping effect provided by the plurality of spherical contact members 41 and the stop segment 3211, the present application limits the axial movement of the transmission rod 20, so as to prevent the transmission rod 20 from detaching from the main body 10.

Although particular embodiments of the application have been described in detail for purposes of illustration, various modifications and enhancements may be made without departing from the scope of the application. Accordingly, the application is not to be limited except as by the appended claims.

What is claimed is:

1. A torque rod, comprising:

a main body having a first end and a second end arranged in opposite to each other along a central axis thereof;

a transmission rod having an insertion end and a first groove, the insertion end being inserted to the first end along the central axis, the first groove disposed around a periphery of the transmission rod and exposed from the first end;

an anti-release sleeve member having a connection part and a stop part that are connected, the connection part being mounted around the first end, so that the anti-release sleeve member is prevented from detaching from the main body along the central axis, the stop part having a second groove disposed on an inner edge thereof, with a setting space formed by the second groove and the first groove;

a low-friction device having a plurality of spherical contact members covered by the anti-release sleeve member and disposed in the setting space, each spherical contact member having a longitudinal axis arranged in parallel to the central axis and dividing the spherical contact member into a first half and a second half, the first half disposed in the first groove in an axial interference arrangement, the second half disposed in the second groove in an axial interference arrangement;

a clutch device disposed in the main body and connected with the insertion end, and the clutch device being switchable between a transmission status and a declutched status;

a torque device disposed in the main body along the central axis and providing a predetermined torque abutting against the clutch device, so that the clutch device is in the transmission status, whereby the transmission rod transmits a torque through the clutch device to the main body;

wherein when the transmission rod bears a torque which is greater than the predetermined torque, the clutch device is switched to the declutched status, whereby the transmission rod is unable to transmit the torque to the main body.

2. The torque rod of claim 1, wherein the first groove completely covers the first half, and the second groove covers at least a part of the second half.

3. The torque rod of claim 2, wherein the second groove comprises a stop segment and an inclined retreat segment that are connected; the stop segment and the spherical contact members generate a positional stopping effect; the spherical contact members are steel balls; the stop segment is formed in an arc shape and has a length thereof smaller than a diameter of each spherical contact member; the first groove is an arc-shape groove.

4. The torque rod of claim 2, further comprising a clamp ring disposed between the connection part and the first end.

5. The torque rod of claim 4, wherein the first end has a first outer diameter, the low-friction device comprises a second outer diameter, and the clamp ring has a third outer diameter; the second outer diameter is smaller than the first outer diameter, and the second outer diameter is smaller than the third outer diameter.

6. The torque rod of claim 1, wherein the clutch device comprises a first tooth member and a second tooth member; the first tooth member is integrally formed with the insertion end of the transmission rod; the first tooth member comprises a plurality of first tooth parts; the main body comprises a chamber therein; the second tooth member is slidably disposed in the chamber along the central axis; the second tooth member comprises a plurality of second tooth parts; the second tooth parts are optionally engaged with or disengaged from the first tooth parts.

7. The torque rod of claim 6, wherein the clutch device further comprises a position limiting rod; a long groove passes through a periphery of the second tooth member along the central axis; the main body comprises a transverse hole disposed thereon along a direction in perpendicular to the central axis, and the position limiting rod passes through the transverse hole and the long groove, such that when the clutch device is in the declutched status, the second tooth member is only allowed to move along the central axis.

8. The torque rod of claim 7, wherein each of the first tooth parts has a first arc segment and a first vertical segment; each of the second tooth parts has a second arc segment and a second vertical segment; when the first tooth parts are engaged with the second tooth parts, each first arc segment adheres to the corresponding second arc segment, and each first vertical segment abuts against the corresponding second vertical segment.

9. The torque rod of claim 8, wherein the torque device comprises a fix member and an elastic member; the chamber is in communication with a thread hole and a spring hole away from the first end; the fix member is screwed to the thread hole; the elastic member is disposed in the spring hole; the elastic member has one end thereof abutting against the clutch device and another end thereof abutting against the fix member; the torque device has a magnetic member arranged away from the first end; the torque rod further comprises a cover member; the cover member is mounted around the main body, such that the position limiting rod is unable to detach from the main body along the direction in perpendicular to the central axis.

10. The torque rod of claim 1, wherein the clutch device comprises a first tooth member and a second tooth member; the first tooth member is separated from the transmission rod; the first tooth member comprises a sleeve hole and a plurality of first tooth parts; the sleeve hole is mounted around the insertion end of the transmission rod; the main body comprises a chamber therein; the second tooth member is slidably disposed in the chamber along the central axis; the second tooth member comprises a plurality of second tooth parts; the second tooth parts are optionally engaged with or disengaged from the first tooth parts.

11. The torque rod of claim 10, wherein the clutch device further comprises a position limiting rod; a long groove passes through a periphery of the second tooth member along the central axis; the main body comprises a transverse hole disposed thereon along a direction in perpendicular to the central axis, and the position limiting rod passes through the transverse hole and the long groove, such that when the clutch device is in the declutched status, the second tooth member is only allowed to move along the central axis.

12. The torque rod of claim 11, wherein each of the first tooth parts has a first arc segment and a first vertical segment; each of the second tooth parts has a second arc segment and a second vertical segment; when the first tooth parts are engaged with the second tooth parts, each first arc segment adheres to the corresponding second arc segment, and each first vertical segment abuts against the corresponding second vertical segment.

13. The torque rod of claim 12, wherein the torque device comprises a fix member and an elastic member; the chamber is in communication with a thread hole and a spring hole away from the first end; the fix member is screwed to the thread hole; the elastic member is disposed in the spring hole; the elastic member has one end thereof abutting against the clutch device and another end thereof abutting against the fix member; the torque device has a magnetic member arranged away from the first end; the torque rod further comprises a cover member; the cover member is mounted around the main body, such that the position limiting rod is unable to detach from the main body along the direction in perpendicular to the central axis.

* * * * *